(12) United States Patent
Larson

(10) Patent No.: US 11,018,556 B2
(45) Date of Patent: May 25, 2021

(54) GENERATORS OPERABLE WITH SHARED OIL SYSTEMS AND INDEPENDENT OIL SYSTEMS

(71) Applicant: Hamilton Sundstrand Corporation, Charlotte, NC (US)

(72) Inventor: Eric Alan Larson, Rockford, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 252 days.

(21) Appl. No.: 16/355,315

(22) Filed: Mar. 15, 2019

(65) Prior Publication Data

US 2020/0295624 A1    Sep. 17, 2020

(51) Int. Cl.
| | | |
|---|---|---|
| *H02K 9/19* | (2006.01) | |
| *F16N 7/38* | (2006.01) | |
| *F16N 7/40* | (2006.01) | |
| *H02K 7/18* | (2006.01) | |

(52) U.S. Cl.
CPC .............. *H02K 9/19* (2013.01); *F16N 7/385* (2013.01); *F16N 7/40* (2013.01); *H02K 7/1823* (2013.01)

(58) Field of Classification Search
CPC ........ H02K 9/19; H02K 7/1823; H02K 9/193; H02K 2213/09; F16N 7/385; F16N 7/40
USPC ......................................... 310/52, 54, 58, 59
See application file for complete search history.

(56) References Cited

U.S. PATENT DOCUMENTS

| | | | |
|---|---|---|---|
| 6,227,221 | B1 | 5/2001 | Schmitz |
| 7,728,447 | B2 | 6/2010 | Becquerelle et al. |
| 2015/0244223 | A1 | 8/2015 | Lee |
| 2017/0081040 | A1 | 3/2017 | Pal |
| 2018/0066552 | A1 | 3/2018 | Waddleton et al. |
| 2018/0219457 | A1* | 8/2018 | Ribarov ................... H02K 9/19 |

OTHER PUBLICATIONS

European Search Report for Application No. 19211118.5, dated Jun. 16, 2020, 10 pages.

* cited by examiner

*Primary Examiner* — Thomas Truong
(74) *Attorney, Agent, or Firm* — Cantor Colburn LLP

(57) ABSTRACT

A generator includes a stator with a stator winding, a rotor with a field winding supported for rotation relative to the stator, and a housing enclosing the stator and the rotor. The housing has an independent system port that is connected to a shared system port by a selector. The selector fluidly couples the stator and one of the independent system port and the shared system port. The selector also fluidly separates the stator from the other of the independent system port and the shared system port. Generator arrangements and methods of making generators are also described.

20 Claims, 8 Drawing Sheets

GENERATORS OPERABLE WITH SHARED OIL SYSTEMS AND INDEPENDENT OIL SYSTEMS

BACKGROUND

The subject matter disclosed herein generally relates to electrical systems, and more particularly to generators for electrical systems that are operable with both shared oil systems and independent oil systems.

Electrical systems, such as on aircraft, commonly include generators. The generators provide electrical power to electrical devices connected to the electrical system, typically using mechanical rotation applied to the generator by an engine. The mechanical rotation rotates a rotor carrying magnet elements relative to a stator winding such that magnetic flux provided by the magnetic elements induces a flow of electric current in the stator windings.

Since the electric current flow induced in the stator windings resistively heats the stator windings and surrounding structures, generators typically require cooling. In some generators the cooling is provided by circulating oil through the generator, generally by connecting the generator to the engine oil system or to an independent oil system. The oil circuit of a generator provisioned with oil from a shared oil system typically has a flow path that differs from that of a generator provisioned with oil from an independent oil system. For that reason generators configured for connection to an independent oil system are typically not interchangeable with generators configured for connection to a shared oil system. Likewise, generators configured for connection to a shared oil system are typically not interchangeable with generators configured for connection to an independent oil system. The oil source dependency can add cost to sparing such generators.

Such generators and generator arrangements and methods have generally been acceptable for their intended purpose. However, there remains a need in the art for improved generators, generator arrangements, and methods of making generators. The present disclosure provides a solution to this need.

BRIEF SUMMARY

In certain embodiments a generator is provided. The generator includes a stator with a stator winding, a rotor with a field winding and supported for rotation relative to the stator, and a housing enclosing the stator and the rotor. The housing has a shared system port connected to a shared system port by a selector, the selector fluidly coupling the stator and one of the independent system port and the shared system port, and the selector fluidly separating the stator from the other of the independent system port and the shared system port.

In addition to one or more of the features described above, or as an alternative, further embodiments may include wherein the housing has a conduit with defining a flow area arranged within an interior of the housing, wherein the selector spans the flow area of the conduit.

In addition to one or more of the features described above, or as an alternative, further embodiments may include wherein the selector comprises a flow passer having a tool engagement feature, wherein the tool engagement feature is located within an interior of the housing.

In addition to one or more of the features described above, or as an alternative, further embodiments may include wherein the selector comprises a flow blocker, the flow blocker having a first seal member extending about a first end of the selector and compressively fixed between the housing and a first seat of the selector, and a second seal member extending about a second end of the selector, the second end longitudinally opposite the first end, the second seal member compressively fixed between the housing and a second seat of the selector.

In addition to one or more of the features described above, or as an alternative, further embodiments may include wherein the selector comprises a flow passer with a flow passage extending therethrough, the flow passage of the flow passer fluidly coupling the stator to the one of the independent system port and the shared system port.

In addition to one or more of the features described above, or as an alternative, further embodiments may include wherein the selector comprises a flow blocker with a monolithic body, the monolithic body of the flow blocker fluidly separating the stator from the other of the independent system port and the shared system port.

In addition to one or more of the features described above, or as an alternative, further embodiments may include a flow blocker fixed within the first seat and fluidly separating the shared system port from the stator, and a flow passer fixed within the second seat and fluidly coupling the independent system port to the stator.

In addition to one or more of the features described above, or as an alternative, further embodiments may include a flow passer fixed within the first seat and fluidly coupling the shared system port to the stator, and a flow blocker fixed within the second seat and fluidly separating the independent system port from the stator.

In addition to one or more of the features described above, or as an alternative, further embodiments may include wherein at least one of the first seat and the second seat extend through a conduit arranged within an interior of the housing.

In addition to one or more of the features described above, or as an alternative, further embodiments may include wherein the housing has a drive end and an anti-drive end, wherein the shared system port is arranged on the drive end of the housing, wherein the independent system port is arranged between the drive end and the anti-drive end of the housing or the anti-drive end of the housing.

In addition to one or more of the features described above, or as an alternative, further embodiments may include wherein the shared system port is a shared system oil-in port, wherein the independent system port is an independent system oil-in port, and wherein the housing has a shared system oil-out port and an independent system oil-out port connected to the selector.

In addition to one or more of the features described above, or as an alternative, further embodiments may include a scavenge pump connecting the independent system oil-out port to the selector, and an inline screen connecting the shared system oil-out port to the selector.

In addition to one or more of the features described above, or as an alternative, further embodiments may include an inline screen connecting the shared system oil-out port to the selector, and a scavenge filter connecting the independent system oil-out port to the selector.

In addition to one or more of the features described above, or as an alternative, further embodiments may include wherein the shared system port is a shared system scavenge port, wherein the independent system port is an independent system oil-in port, the generator having a scavenge filter bypass conduit connecting the selector to the shared system scavenge port and a check valve connecting the selector to the independent system oil-in port.

In addition to one or more of the features described above, or as an alternative, further embodiments may include wherein the selector is an oil-in system selector, the generator having an oil-out selector connected to the oil-in selector by the stator and a scavenge selector connected to the oil-in selector by the rotor.

In accordance with certain embodiments a generator arrangement is provided. The generator arrangement includes a generator as described above and an accessory gearbox. The accessory gearbox has an accessory mount supporting the generator, a scavenge selector is connected to the oil-in selector by the rotor, and a plug seated in the independent system port.

A method of making a generator is also provided. The method includes, at a housing having a shared system port and an independent system port, enclosing a stator with a stator winding in the housing and supporting a rotor with a rotor winding for rotation relative to the stator. The stator is fluidly coupled with one of the shared system port and the independent system port by the selector, and the stator is fluidly separated from the other of the shared system port and the independent system port with the selector.

In addition to one or more of the features described above, or as an alternative, further embodiments may include fluidly coupling the stator with the other of the shared system port and the independent system port with the selector, and fluidly separating the stator from the other of the of the shared system port and the independent system port with the selector.

Technical effects of embodiments of the present disclosure include generators capable for operation with either shared oil systems or independent oil systems. In certain embodiments a singular housing provides capability for the generator to operate with either a shared oil system or an independent oil system. In accordance with certain embodiments, generators described herein can be configured for operation with either a shared oil system or an independent oil system by configuring selectors arranged within the housing of the generator. It is also contemplated that the selectors be configured, and as required re-configured, for operation with either shared oil systems or independent oil systems by changing the placement of flow passers and flow blockers disposed within the housing and inter changeable among selector seats arranged within the housing.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
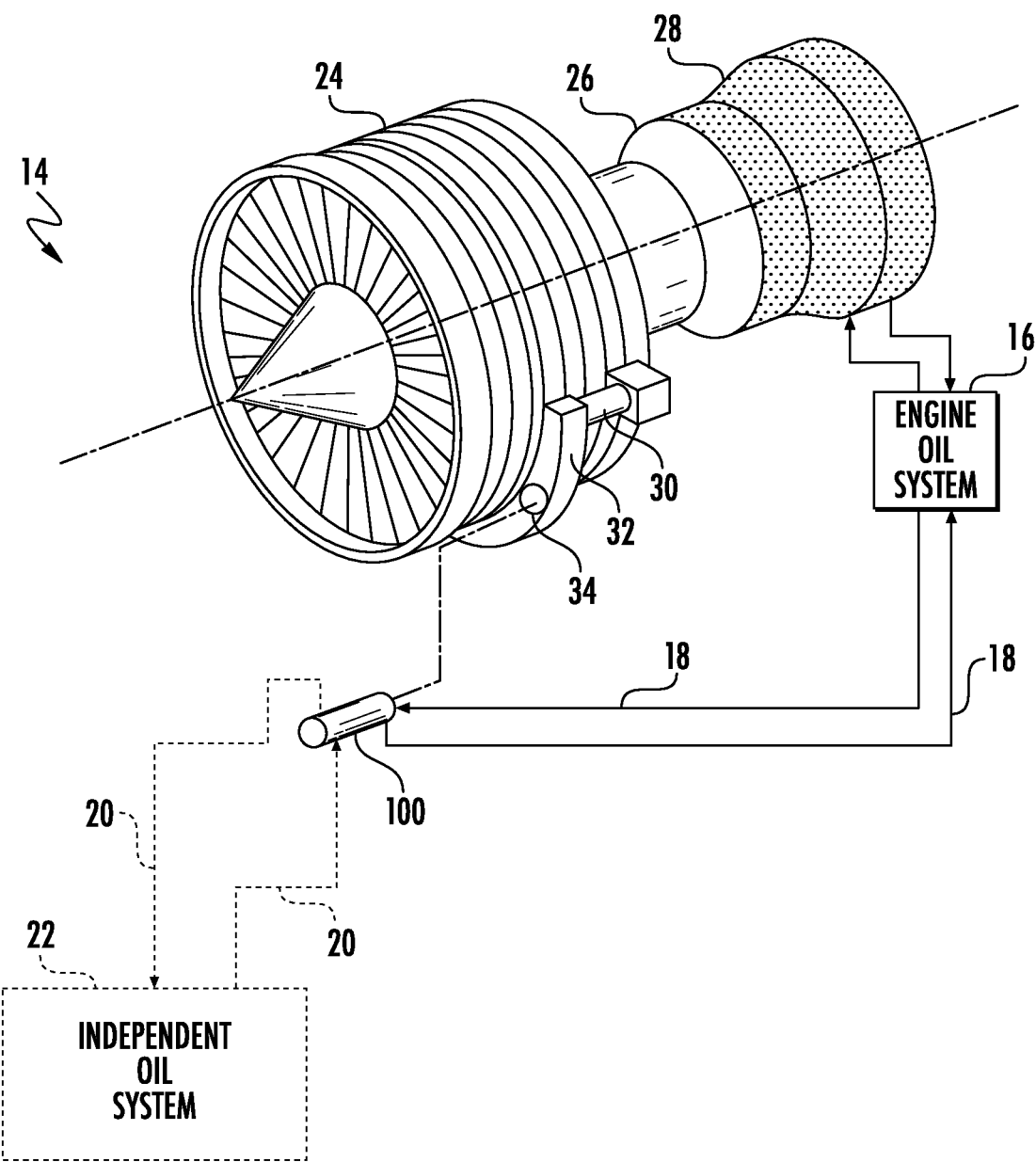
FIG. 1 is a perspective view of alternative arrangements of a generator constructed in accordance with the present disclosure, showing the generator in an first generator arrangement wherein the generator is operable to circulate oil from a shared oil source and the generator in a second generator arrangement wherein the generator is operably to circulate oil from an independent oil system.

Reference will now be made to the drawings wherein like reference numerals identify similar structural features or aspects of the subject disclosure. For purposes of explanation and illustration, and not limitation, a partial view of an exemplary embodiment of a generator in accordance with the disclosure is shown in FIG. 1 and is designated generally by reference character 100. Other embodiments of generators, generator arrangements, and methods of making generators in accordance with the present disclosure, or aspects thereof, are provided in FIGS. 2-8, as will be described. The generators and generator arrangements described herein can be used with shared oil systems or independent oil systems, such engine oil systems on aircraft main engines and auxiliary power units, though the present disclosure is not limited to aircraft engines or to any particular type of oil system in general.

Referring now to FIG. 1, a first generator arrangement 10 and a second generator arrangement 12 are shown. In the first generator arrangement the generator 100 is operatively associated with a gas turbine engine 14 having an engine oil system 16. In the first generator arrangement 10 the generator 100 is arranged to circulate shared source oil 18 from engine oil system 16. In the second generator arrangement 12 the generator 100 is arranged to circulate independent source oil 20 from an independent oil system 22, shown in dashed outline.

The gas turbine engine 14 includes a compressor section 24, a combustor section 26, and a turbine section 28. The gas turbine engine 14 also includes a power-take-off (PTO) shaft 30 and an accessory gearbox 32 with an accessory mount 34. The compressor section 24 is operably associated with turbine section 28 and is arranged to receive therefrom mechanical work. During operation, the compressor section 24 ingests air from the external environment and compresses the air using the mechanical work provided by the turbine section 28. The compressed air is communicated to the combustion section 26, which generates a flow of high pressure combustion products and communicates the high pressure combustion products to the turbine section 28.

The turbine section 28 expands the high pressure combustion products, extracts work from the high pressure combustion products as they expand, and communicates the work to the compressor section 24. A portion of the work extracted by the turbine section 28 is also communicated to the generator 100 as mechanical rotation through the accessory gearbox 32, though the PTO shaft 30. The mechanical rotation rotates a rotor 106 (shown in FIG. 2) of the generator 100 to generate electrical power, which is used to power electrical devices connected to the generator 100.

As will be appreciated by those of skill in the art in view of the present disclose, heat is generated during the operation of the generator 100. To remove this heat the generator 100 oil received from either the engine oil system 16 or the independent oil system 22 is circulated through the generator 100. To render the generator 100 operable with oil from either the engine oil system 16 or the independent oil system 22 the generator includes an oil circuit 162 (shown in FIG. 2) having a plurality of selectors, e.g., the oil-in selectors 174, the oil-out selector 176, and the scavenge selector 178 (shown in FIG. 2), the selectors arranged to configure (and re-configured, as appropriate) the generator 100 to circulate oil from either the engine oil system 16 or the independent oil system 22. While shown and described herein as employing oil for coolant, those of skill in art the will appreciate that generators employing other types of fluids for cooling and/or lubrication can also benefit from the present disclosure.

Figure 2:
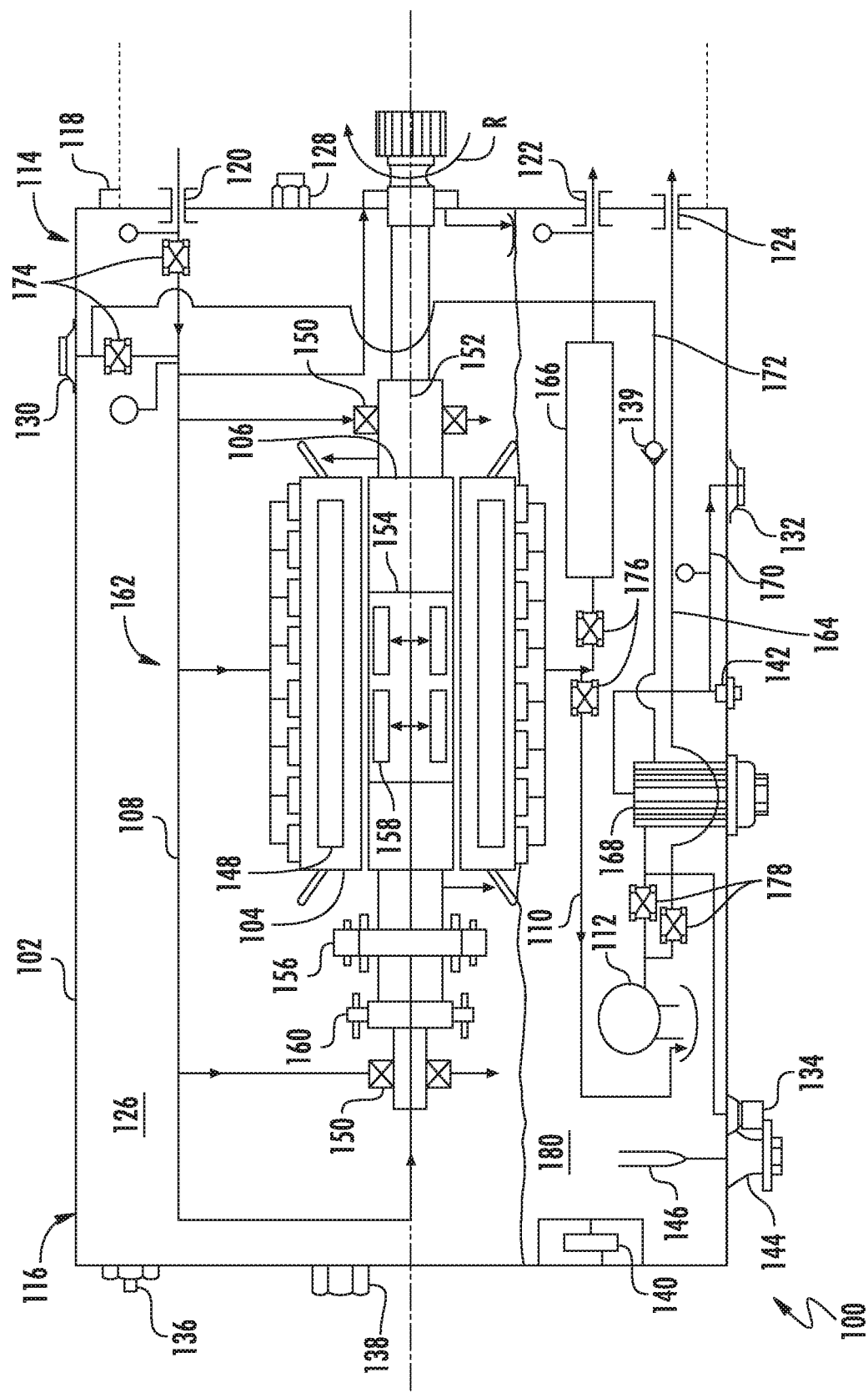
FIG. 2 is a schematic view of the generator of FIG. 1, showing a generator housing with an oil circuit having selectors for configuring the generator to circulate oil from a shared oil system or an independent oil system, as appropriate for a contemplated application of the generator.

With reference to FIG. 2, the generator 100 is shown. The generator 100 includes a housing 102, a stator 104, and a rotor 106. The stator 104 is arranged within the housing 102 and the rotor 106 is supported for rotation relative to the stator 104. The generator also includes the oil circuit 162, which is configurable to circulate oil from either the engine oil system 16 or the independent oil system 22, as will be described.

The housing 102 has a drive end 114 and an anti-drive end 116. The drive end 114 includes a mounting feature 118 configured and adapted to support the generator 100 at the accessory mount 34 (shown in FIG. 1) of the accessory gearbox 32 (shown in FIG. 1). A shared system oil-in port 120, a shared system oil-out port 122, and a shared system scavenge port 124 each extend through the housing 102 at the drive end 114 of the housing 102 and are in fluid communication with an interior 126 of the housing 102. More particularly, each of the shared system oil-in port 120, shared system oil-out port 122, and the shared system scavenge port 124 are axially overlapped by the accessory mount 34 and are arranged to communicate shared source oil 18 (shown in FIG. 1) between the generator 100 and the engine oil system 16 (shown in FIG. 1). A case pressure relief valve 128 is also located on the drive end 114 of the housing 102 for relieving pressure from the interior 126 of the housing 102 when the generator 100 is supplied the independent source oil 20 (shown in FIG. 1) from the independent oil system 22 (shown in FIG. 1).

The housing 102 also includes an independent system oil-in port 130, an independent system oil-out port 132, and an independent system pressure oil-fill port 134. Each of the independent system oil-in port 130, the independent system oil-out port 132, and the independent system pressure oil-fill port 134 extend through the housing 102 at locations other than the drive end 114 of the housing 102, e.g., on upper and lower surfaces of the housing 102 (relative to the top of FIG. 2), and are configured to communicate independent source oil 20 (shown in FIG. 1) between the generator 100 and the independent oil system 22 (shown in FIG. 1).

The housing 102 additionally includes a push-to-vent feature 136, a vacuum break valve 138, a sight glass 140, an external visual differential pressure indicator (DPI) 142, and a standpipe port 144. The push-to-vent feature 136 is configured and adapted to selectively vent the interior 126 of the housing 102 to the external environment manually when the generator 100 is connected to the independent oil system 22 (shown in FIG. 1), such as upon actuation by a maintainer. The vacuum break valve 138 is configured and adapted for equalizing pressure within the interior 126 of the housing 102 with the external environment manually, also when the generator 100 is connected to the independent oil system 22 (shown in FIG. 1) when actuated by a maintainer. The sight glass 140 is configured and adapted to provide visual indication the level of oil within the interior 124 of the housing 102, e.g. within a sump, when the generator 100 is connected to the independent oil system 22, for example to provide state of fill indication to a maintainer. The external visual DPI 142 provides an indication of pressure across the scavenge filter 168 when the generator 100 is connected to the independent oil system 22. The standpipe port 144 is in fluid communication with a standpipe 146 located within the interior 124 of the generator and is arranged discharge oil from the interior 102 of the housing 102 when oil level within the housing exceeds a predetermined level.

The stator 104 includes a stator winding 148 and is fixed within the interior 126 of the housing 102. The rotor 106 is supported for rotation relative to the stator winding 148 by a bearing arrangement 150 about a rotation axis 152 and extends axially from the drive end 114 of the housing 102. In this respect a portion of the generator 100 including a shear feature and a drive feature are received within the accessory gearbox 32 (shown in FIG. 1) to receive mechanical rotation R from the gas turbine engine 14 (shown in FIG. 1) and the PTO shaft 30 (shown in FIG. 1. It is contemplated that the rotor 106 carry a magnetic element to induce current in the stator winding 148 as magnetic element rotate about the rotation axis 152 relative to the stator winding 148. As shown in FIG. 2 the magnetic element is a field winding 154.

The field winding 154 is in electrical communication with an exciter 156 through a rotating rectifier 158 for generating magnetic flux during rotation with current provided by the exciter 156. More specifically, the mechanical rotation R of the rotor 106 generates an excitation current using a permanent magnet generator 160 operably connected to the rotor 106, which the exciter 156 communicates to the rotor 106 for rectification by the rotating rectifier 158 and application to the field winding 154. In certain embodiments the generator 100 can be a variable speed constant frequency (VSCF) electric machine. Examples of such VSCF electric machines includes those described in U.S. Patent Application Publication No. 2003/0164651 A1 to Tornquist et al., filed Jun. 3, 2002, the contents of which are incorporated herein by reference in their entirety. Although shown in described herein in the context of a wound field machine, constant speed and/or permanent magnet-type electric machines can also benefit from the present disclosure.

As will be appreciated by those of skill in the art in view of the present disclosure, structures within the interior of the generator 100 generate heat during operation. For example, one or more electrical structure within the generator 100 such as the stator winding 148, the permanent magnet generator 160, the exciter 156, the rotating rectifier 158, and the field winding 154 can require oil to remove heat generated by resistive heating of current-carrying elements. The bearing arrangement 150 also generates heat from friction associated with rotation of the rotor 106, and can require oil for heat removal and/or lubrication. The oil circuit 162 is arranged to circulate oil through the generator 100 to remove heat and/or provide lubricant, as appropriate, and is easily modified to operate with either the engine oil system 16 (shown in FIG. 1) or the independent oil system 22 (shown in FIG. 1), as suitable for a contemplated application of the generator 100.

The oil circuit 162 includes the supply conduit 108, the return conduit 110, and the scavenge pump 112. The oil circuit 162 also includes a sump 180, a scavenge filter 168, and an inline screen 166. In addition, the oil circuit 162 includes scavenge filter bypass conduit 164, a scavenge filter to independent system oil-out port conduit 170, and an external circuit bypass 172. A plurality of selectors are arranged along the oil circuit 162, FIG. 2 showing an oil-in selector 174, an oil-out selector 176, and a scavenge selector 178.

The oil-in selector 174 connects the independent system oil-in port 130 and the shared system oil-in port 120 to the supply conduit 108. The supply conduit 108 is in turn connected to the stator 104, the rotor 106, and the bearing arrangement 150. The bearing arrangement 150 is connected to the sump 180. The rotor 106 is also connected to the sump 180 through one or more of the permanent magnet generator 160, the exciter 156, the rotating rectifier 158, and/or the field winding 154.

The stator 104 is connected to the oil-out selector 176. The oil-out selector 176 is in turn connected to the scavenge pump 112 through the return conduit 110 and the sump 180. The scavenge pump 112 is connected to the shared system oil-out port 122 through the inline screen 166. The scavenge selector 178 connects the scavenge pump 112 to the shared system scavenge port 124 through the scavenge filter bypass conduit 164. The scavenge selector 178 also connects the scavenge pump 112 to the scavenge filter 168, and therethrough to the independent system oil-out port 132.

It is contemplated that each of the plurality of selectors fluidly couple the stator 104 to either the independent system oil-in port and or the shared system oil-in port to which the selector is connected. It is also contemplated that each of the plurality of selectors fluidly separate the stator 104 from the other of the other of the independent system port and one shared system port to which the selector is connected. In this respect the oil-in selector 174 connects the stator 104 to the independent system oil-in port 130 and the shared system oil-in port 120, the oil-out selector 176 connects the stator 104 to the shared system oil-out port 122 and the independent system oil-out port 132, and the scavenge selector 178 connects the stator 104 to the independent system oil-in port 130 and the independent system oil-out port 132. It is contemplated that the fluid communication be established by the arrangement (or re-arrangement) of flow passers, i.e., flow passer 117, flow passer 125, and flow passer 182 (shown in FIG. 4,) and flow blockers, i.e., flow blocker 121, flow blocker 129, and flow blocker 184 (shown in FIG. 4), in seat pairs of the respective selectors.

Figure 3A:
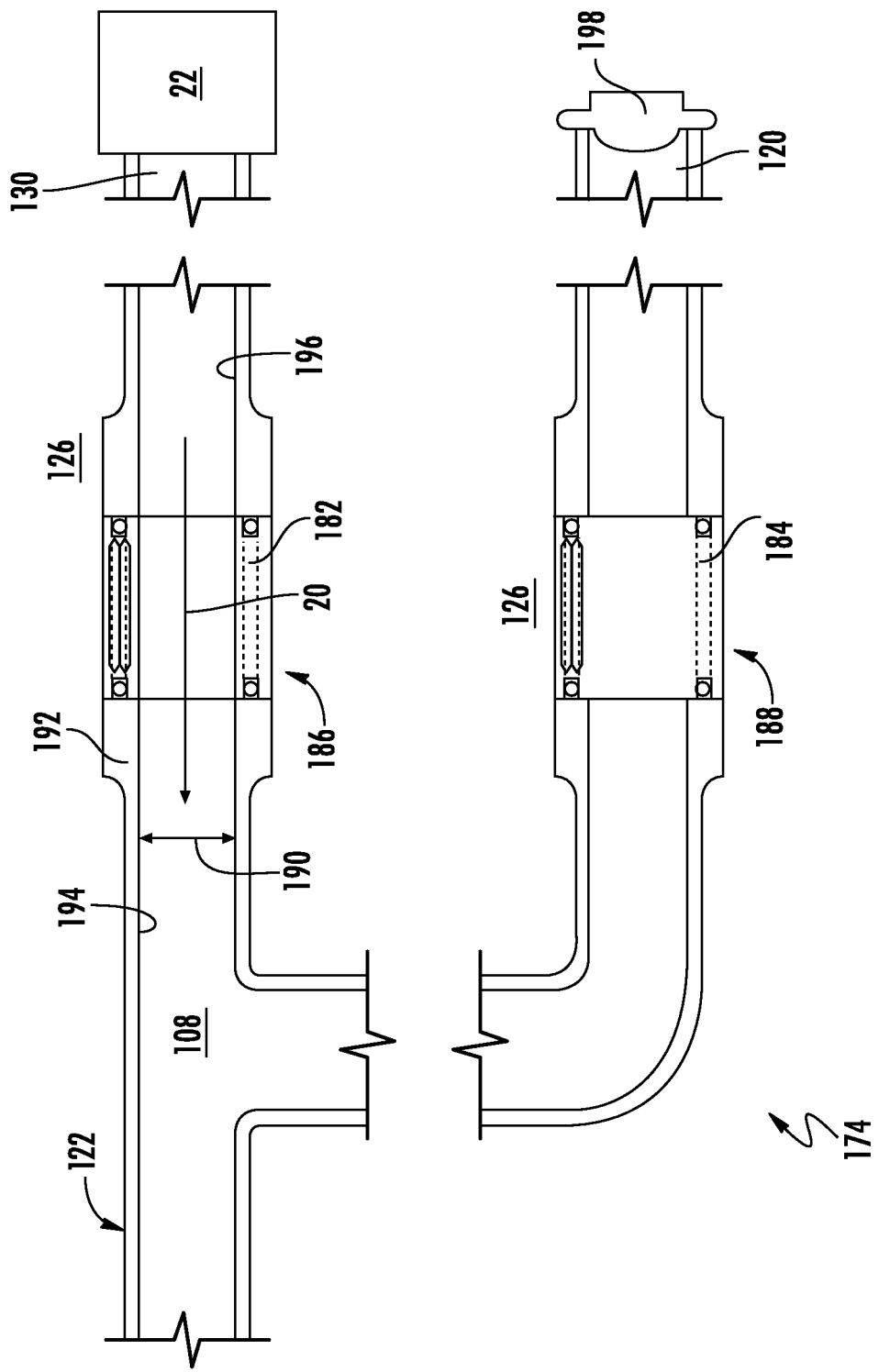
FIGS. 3A and 3B are side elevation view of a separator of the generator of FIG. 1, showing a selector seating a flow blocker and a flow passer in seats of selector for circulating oil from a shared oil system and an independent oil system, respectively.
Figure 3B:
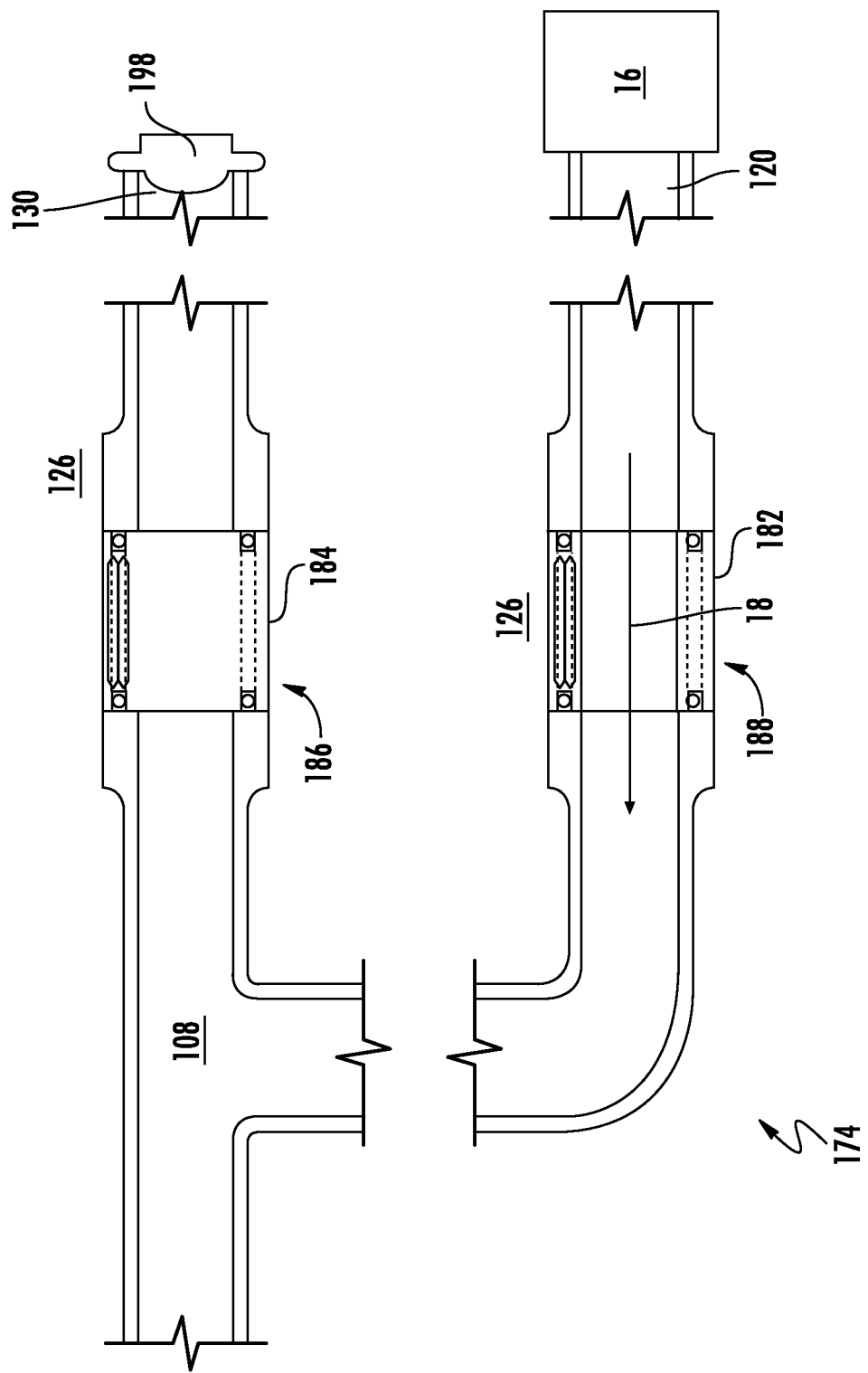

With reference to FIGS. 3A and 3B, the oil-in selector 174 and a portion of the supply conduit 108 are shown. The supply conduit 108 is arranged within the interior 126 of the housing 102 (shown in FIG. 2) and defines a flow area 190. The oil-in selector 174 includes a first seat 186 and a second seat 188. The first seat 186 connects the independent system oil-in port 130 to the stator 104 (shown in FIG. 2) through the supply conduit 108, the first seat extending through the supply conduit 108 within in interior 126 of the housing 102. It is contemplated that the first seat 186 be defined by the housing 102 and in this respect the first seat 186 extends through the flow area 190 defined by supply conduit 108, e.g., between a first interior surface 194 and a second interior surface 196 of the supply conduit 108 such that the oil-in selector 174 spans the flow area 190 of the supply conduit 108. In certain embodiments the housing 102 may include a cored or drilled body defining the supply conduit 108, the first seat 186 intersecting the supply conduit 108 within the interior 126 of the housing 102. On one end the first seat 186 is in communication with the supply conduit 108 and on another end the first seat 186 is in communication with the shared system oil-in port 120.

The second seat 188 is similar to the first seat 186, and additionally connects the shared system oil-in port 120 to the stator 104 (shown in FIG. 2) through the supply conduit 108. It is contemplated that the second seat 188 connect the independent system oil-in port 130 to the stator 104 through the supply conduit 108, the second seat 188 connecting to the supply conduit 108 at a location along the supply conduit 108 at a location between the first seat 186 and the stator 104. An optional plug 198 can be seated in within the independent system oil-in port 130 of the oil-in selector 174 on a side of the flow blocker 184 opposite the supply conduit 108 to prevent contamination from entering the independent system oil-in port 130, simplifying re-configuration of the generator 100 to receive oil from an independent oil source, e.g., the independent oil system 22 (shown in FIG. 1).

As shown in FIG. 3A, a flow passer 182 is fixed within the first seat 186 and a flow blocker 184 is fixed within the second seat 188. The flow passer 182 fluidly couples the shared system oil-in port 120 to the stator 104 (shown in FIG. 2) and the flow blocker 184 fluidly separates the independent system oil-in port 130 to the stator 104. Fixation of the flow passer 182 within the first seat 186 allows the a shared oil-source, e.g., the engine oil system 16, to provide a flow of shared source oil 18 to the stator 104 through the flow passer 182 and the supply conduit 108. Fixation of the flow blocker 184 within the second seat 188 prevents communication between the independent system oil-in port 130 and the supply conduit 108.

It is contemplated that the flow passer 182 and the flow blocker 184 be interchangeable with one another. In this respect FIG. 3B shows the flow passer 182 fixed within the second seat 188 and the flow blocker 184 fixed within the first seat 186. Fixation of the flow passer 182 within the second seat 188 allows an independent oil-source, e.g., the independent oil system 22, to provide a flow of independent source oil 20 to the stator 104 (shown in FIG. 2) through the flow passer 182 and the supply conduit 108. Fixation of the flow blocker 184 within the first seat 186 prevents communication between the shared system oil-in port 120 and the supply conduit 108. Optionally, the plug 198 can be seated in within the first seat 186 on a side of the flow blocker 184 opposite the supply conduit 108 to prevent contamination from entering the shared system oil-in port 120, simplifying re-configuration of the generator 100 to receive oil from a shared oil source, e.g., the engine oil system 16 (shown in FIG. 1).

Figure 4:
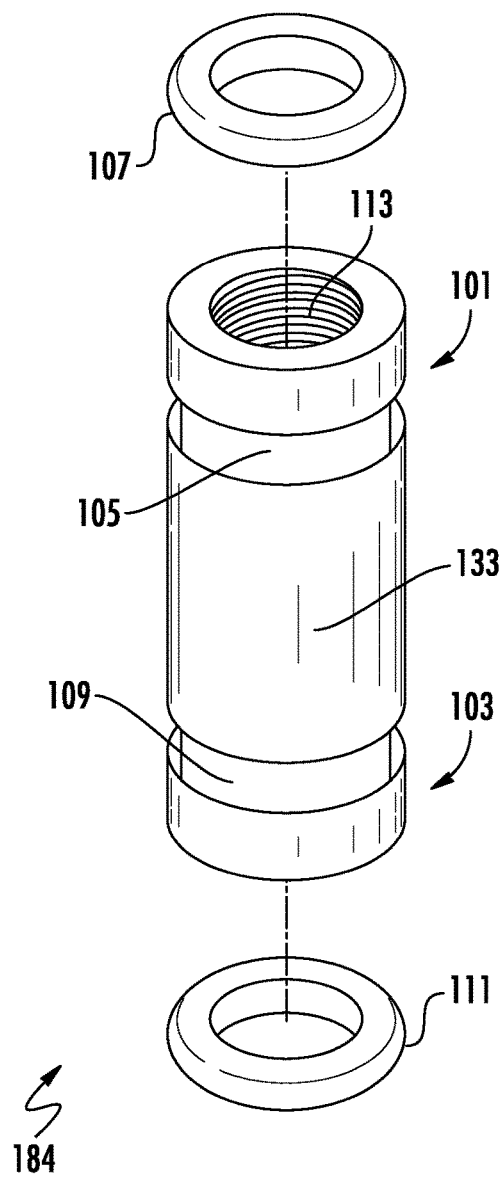
FIGS. 4 and 5 are perspective views of a flow blocker and a flow passer for the generator, showing a monolithic body of the flow blocker and a flow passage of the flow passer, respectively.
Figure 5:
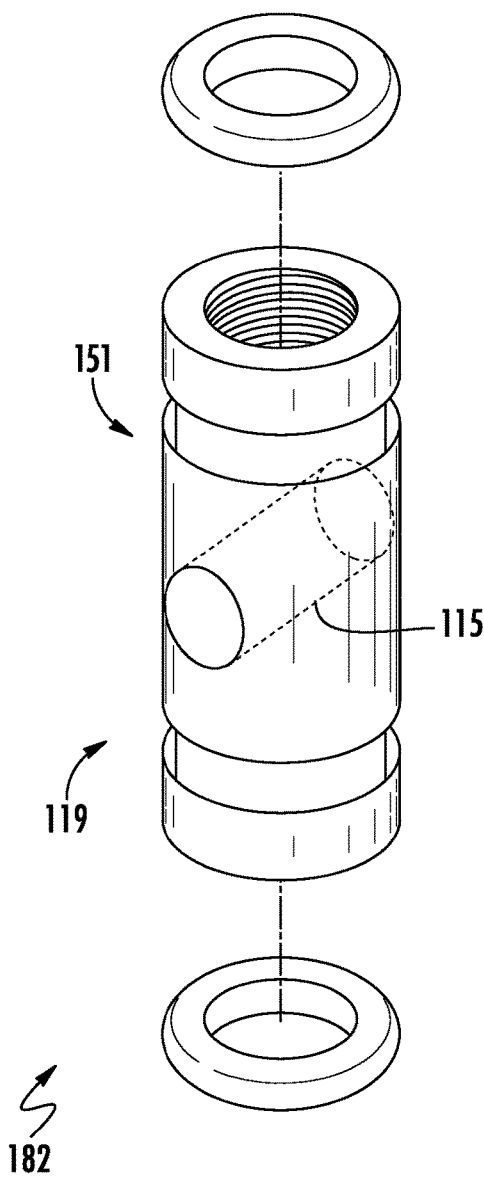

With reference to FIGS. 4 and 5, the flow blocker 184 and the flow passer 182 are shown, respectively. As shown in FIG. 4, the flow blocker 184 has a monolithic body 133 that is cylindrical in shape with a first end 101 and a longitudinally opposite second end 103. A first annular groove 105 is defined within the first end 101 and a first seal member 107 is seated therein and about the first end 101 for compressive engagement between the interior of the first seat 186 (shown in FIG. 3A), or the interior of the second seat 188, and the first end 101 of the flow blocker 184. A second annular groove 109 is defined on the second end 103 of the flow blocker 184, a second seal member 111 seated therein and the about the second end 103 also for compressive engagement between the interior of the first seat 186, of the interior of the second seat 188, and the second end 103 of the flow blocker 184.

A tool engagement feature 113 is defined on the first end 101 of the flow blocker 184, the tool engagement feature 113 arranged to allow a tool to fix and/or remove the flow blocker 184 in the first seat 186 or the second seat 188 to configure the generator 100 (shown in FIG. 1) to receive oil from the engine oil system 16 (shown in FIG. 1) or the independent oil system 22 (shown in FIG. 1). As shown in FIGS. 3A and 3B it is contemplated that the tool engagement feature be arranged within the interior 126 of the housing 102 when the flow blocker 184 is fixed within the oil-in selector 174, which prevents tampering with the oil circuit 162 of the generator 100 once configured for one of the engine oil system 16 and the independent oil system 22. In certain embodiments the tool engagement feature 113 secures the flow blocker in place and/or serves as an anti-rotation feature.

With reference to FIG. 5, the flow passer 182 is similar to the flow blocker 184 and additionally defines a flow passage 115. The flow passage 115 is defined longitudinally between a first end 151 and a second end 1153 of the flow passer 182, the flow passage 115 extending laterally through the flow passer 182. As shown in FIGS. 3A and 3B, it is contemplated that the flow passage 115 being in registration with the supply conduit 108 and one of the shared system oil-in port 120 (shown in FIG. 3A) and the independent system oil-in port 130 (shown in FIG. 3B) once fixed within the oil-in selector 174, the flow passer 182 thereby fluidly coupling one of the engine oil system 16 and the independent oil system to the supply conduit 108, and therethrough the stator 104 (shown in FIG. 2), to provide a flow of oil thereto. An o-ring 135 and an o-ring 137 seat about the flow passer 182 on longitudinally opposites sides of the flow passage 115.

With continuing reference to FIG. 2, the oil-out selector 176 and the scavenge selector 178 are similar to the oil-in selector 174 and are additionally connected on a side of the stator 104 opposite (relative to the direction of oil flow) the oil-in selector 174. Specifically, the oil-out selector 176 connects the stator 104 to the scavenge pump 112 through the return conduit 110, and to the shared system oil-out port 122 through the inline screen 166. The scavenge selector 178 connects the scavenge pump 112 to the shared system scavenge port 124 through the scavenge filter bypass conduit 164, and to the independent system oil-in port 130 through the external circuit bypass 172 and a check valve 139 connecting the scavenge selector 718 to the independent system oil-in port. 130. As will be appreciated by those of skill in the art in view of the present disclosure, flow blocker and flow passer arrangement selection in seats of the oil-out selector 176 and the scavenge selector 178 renders the generator 100 operably with either a shared oil source, e.g., the engine oil system 16 (shown in FIG. 1), or an independent oil source, e.g., the independent oil system 22 (shown in FIG. 1).

With reference to FIG. 2, the first generator arrangement 10 is shown. In the first generator arrangement 10 the generator 100 is operable to circulate shared source oil received from the engine oil system 16. In this respect the generator 100 is supported at the accessory mount 34 and the rotor 106 coupled to the PTO shaft 30 (shown in FIG. 1) to receive through the accessory gearbox 32 mechanical rotation R, the generator 100 thereby producing electrical power through rotation of the rotor 106 relative to the stator 104.

Figure 6:
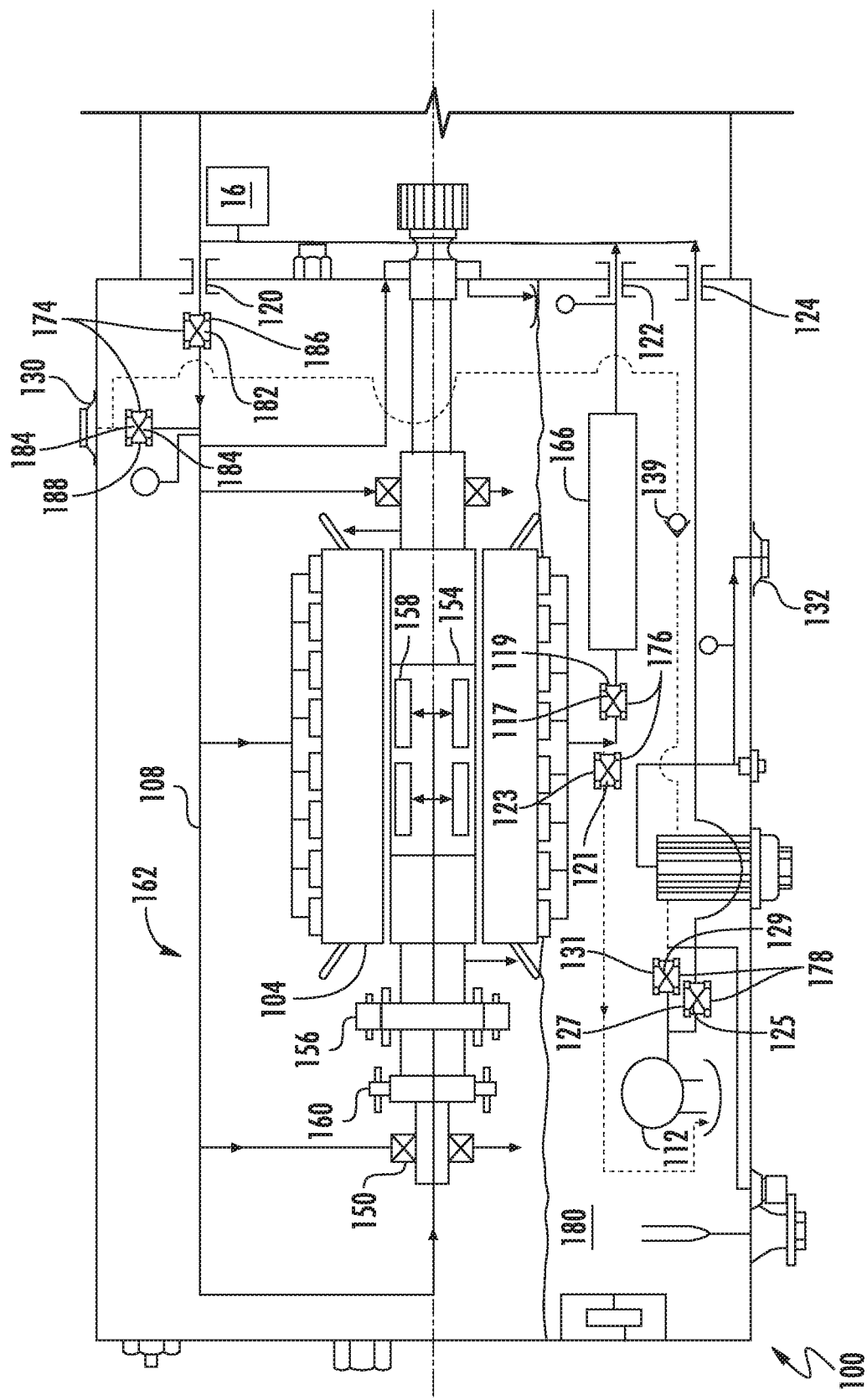
FIG. 6 is a schematic view of the generator of FIG. 1, showing flow blockers and flows passers disposed within the selector seats of the generator oil circuit such that the generator is operable to circulate oil from a shared oil source.

With reference to FIG. 6, the first generator arrangement 10 is shown. In the first generator arrangement 10 the generator 100 is operable to circulate the shared source oil 18 (shown in FIG. 1) using the oil circuit 162. In particular the engine oil system 16 is in fluid communication with the oil circuit 162 through the shared system oil-in port 120, the shared system oil-out port 122, and the shared system scavenge port 124. Shared source oil 18 from the engine oil system 16 enters the generator 100 through the shared system oil-in port 120, flows to the stator 104 through the supply conduit 108, and returns to the shared system oil-out port 122 through the inline screen 166. In certain embodiments a portion of the shared source oil 18 is also circulated by the oil circuit 162 through one or more of the bearing arrangement 150, the permanent magnet generator 160, the exciter 156, the rotating rectifier 158 and the field winding 154, and thereafter returned to the engine oil system 16 through the sump 180 and shared system scavenge port 124. In this respect the scavenge pump 112 draws a portion of the shared source oil 18 from the sump 180 and flows the shared source oil 18 through the scavenge filter bypass conduit 164 to the shared system scavenge port 124. Once forced through the shared system scavenge port 124 by the scavenge pump 112, the shared source oil 18 drawing by the scavenge pump 112 rejoins the shared source oil 18 returned through the shared system oil-out port 122 for recirculation by the engine oil system 16. In certain embodiments the scavenge pump 112 can have a smaller pumping capacity than that required when the generator 100 is configured for operation with an independent oil source, e.g., the independent oil system 22 (shown in FIG. 1).

Circulation of the shared source oil 18 through the generator 100 by the oil circuit 162 is accomplished by disposition of flow passers and flow blockers within seats of the oil-in selector 174, the oil-out selector 176, and the scavenge selector 178 of the oil circuit 162. In this respect the flow passer 182 is fixed within the first seat 186 of the oil-in selector 174 and the flow blocker 184 is fixed within the second seat 188 of the oil-in selector 174. So fixed the oil-in selector 174 fluidly couples the shared system oil-in port 120, and therethrough the engine oil system 16, to the stator 104 via the supply conduit 108 while fluidly separating the independent system oil-in port 130 from the stator 104.

A flow passer 117 is fixed within a first seat 119 of the oil-out selector 176 and a flow blocker 121 is fixed within a second seat 123 of the oil-out selector 176. So fixed the oil-out selector 176 fluidly couples the stator 104 to the shared system oil-out port 122 and fluidly separates the stator 104 from independent system oil-out port 132.

In addition, a flow passer 125 is fixed within a first seat 127 of the scavenge selector 178 and a flow blocker 129 is fixed within a second seat 131 of the scavenge selector 178. So fixed the scavenge selector 178 fluidly couples the stator 104, through the sump 180 and the scavenge pump 112, to the shared system scavenge port 124. The scavenge selector 178 also cooperates with the oil-out selector 176 to fluidly separate the stator 104, via the sump 180 and the scavenge pump 112, from the independent system oil-in port 130. It is contemplated the fixation of the flow blockers and flow passers be accomplished manually, such as when the generator 100 is undergoing initial assembly or during re-assembly following an overhaul.

Figure 7:
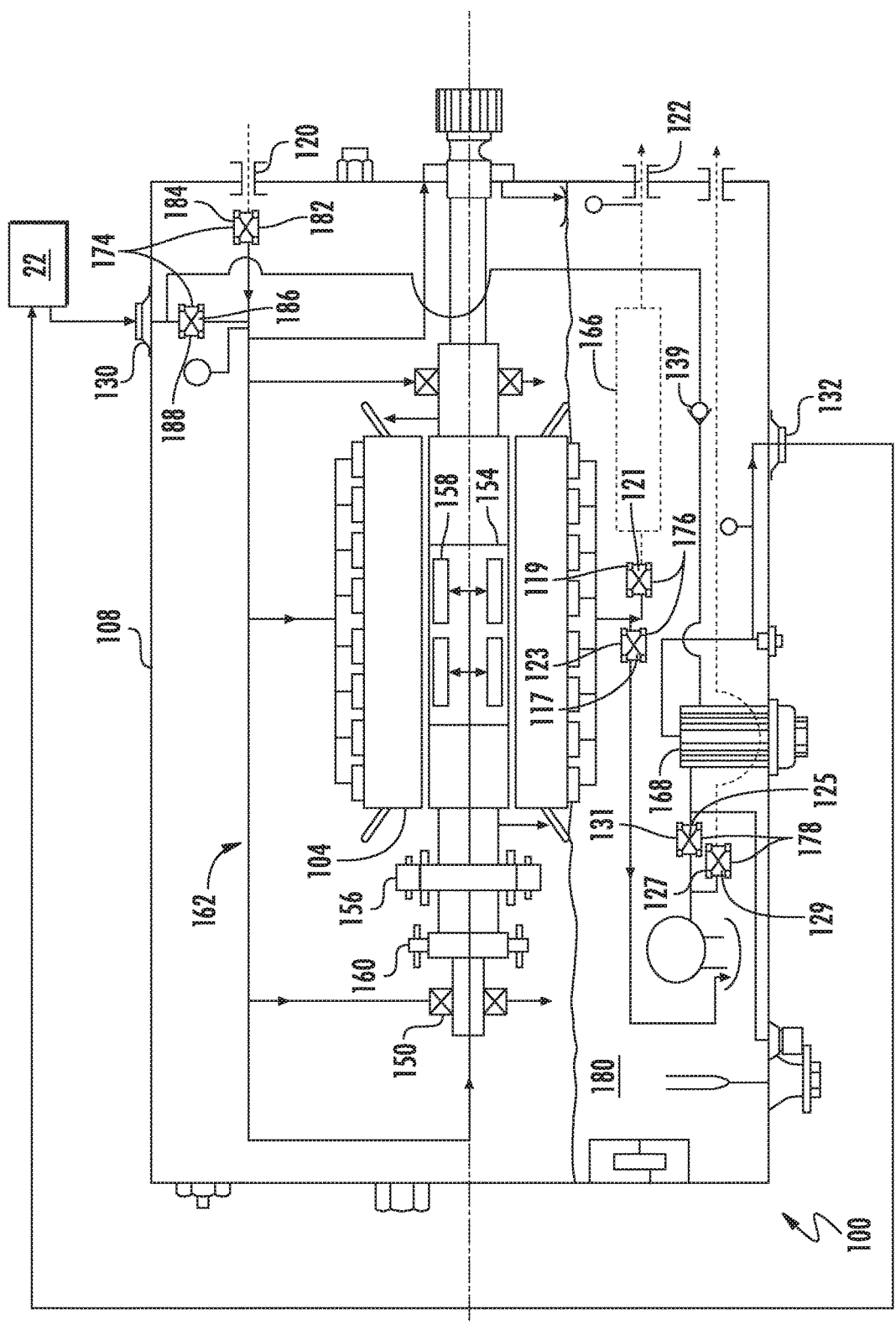
FIG. 7 is a schematic view of the generator of FIG. 1, showing flow blockers and flows passers disposed within the selector seats of the generator oil circuit such that the generator is operable to circulate oil from an independent oil source.

With reference to FIG. 7, the second generator arrangement 12 is shown. In the second generator arrangement 12 the generator 100 is operable to circulate the independent source oil 20 (shown in FIG. 1) using the oil circuit 162. In particular, the independent oil system 22 is in fluid communication with the oil circuit 162 through the independent system oil-in port 130 and the independent system oil-out port 132. This allows the independent source oil 20 from the independent oil system 22 to enter the generator 100 through the independent system oil-in port 130, flow to the stator 104 through the supply conduit 108, and return to the independent oil system 22 through the independent system oil-out port 132 through the sump 180 and scavenge filter 168. In certain embodiments a portion of the independent source oil 20 also circulates through the one or more bearing arrangement 150, the permanent magnet generator 160, the exciter 156, the rotating rectifier 158 and the field windings 154, and thereafter returns to the independent oil system 22 through the sump 180, scavenge pump 112, and scavenge filter 168 via the independent system oil-out port 132.

Circulation of the independent source oil 20 through the generator 100 by the oil circuit 162 is accomplished by changing the disposition of flow passers and flow blockers within seats of the selectors, e.g., the oil-in selector 174, the oil-out selector 176, and the scavenge selector 178, of the oil circuit 162. Specifically, the flow blocker and flow passer of each selector are switched between seats in relation to the disposition shown in FIG. 6. For example, the respect the flow blocker 184 is fixed within the first seat 186 of the oil-in selector 174 and the flow passer 182 is fixed within the second seat 188 of the oil-in selector 174. So fixed the oil-in selector 174 fluidly couples the independent system oil-in port 130, and therethrough the independent oil system 22, to the stator 104 through the supply conduit 108 while the oil-in selector 174 fluidly separates the shared system oil-in port 120 from the stator 104. Further, the flow blocker 121 is fixed within a first seat 119 of the oil-out selector 176 and a flow passer 117 is fixed within a second seat 123 of the oil-out selector 176. So fixed the oil-out selector 176 fluidly couples the stator 104 to the independent system oil-out port 132 and fluidly separates the stator 104 from shared system oil-out port 122. In addition, the flow blocker 129 is fixed within a first seat 127 of the scavenge selector 178 and a flow passer 125 is fixed within a second seat 131 of the scavenge selector 178. So fixed, the scavenge selector 178 additionally fluidly couples the stator 104, through the sump 180, the scavenge filter 168 and the scavenge pump 112, to the independent system oil-out port 132 and fluidly separates the stator 104, via the sump 180 and the scavenge pump 112, from the shared system scavenge port 124. The scavenge pump 112 in turn draws oil from the sump 180 and drives the oil out of the generator 100. Here again it is contemplated the fixation of the flow blockers and flow passers be accomplished manually, such as when the generator 100 is undergoing initial assembly or during re-assembly following an overhaul, or when the generator 100 is to be configured for a different oil system.

Figure 8:
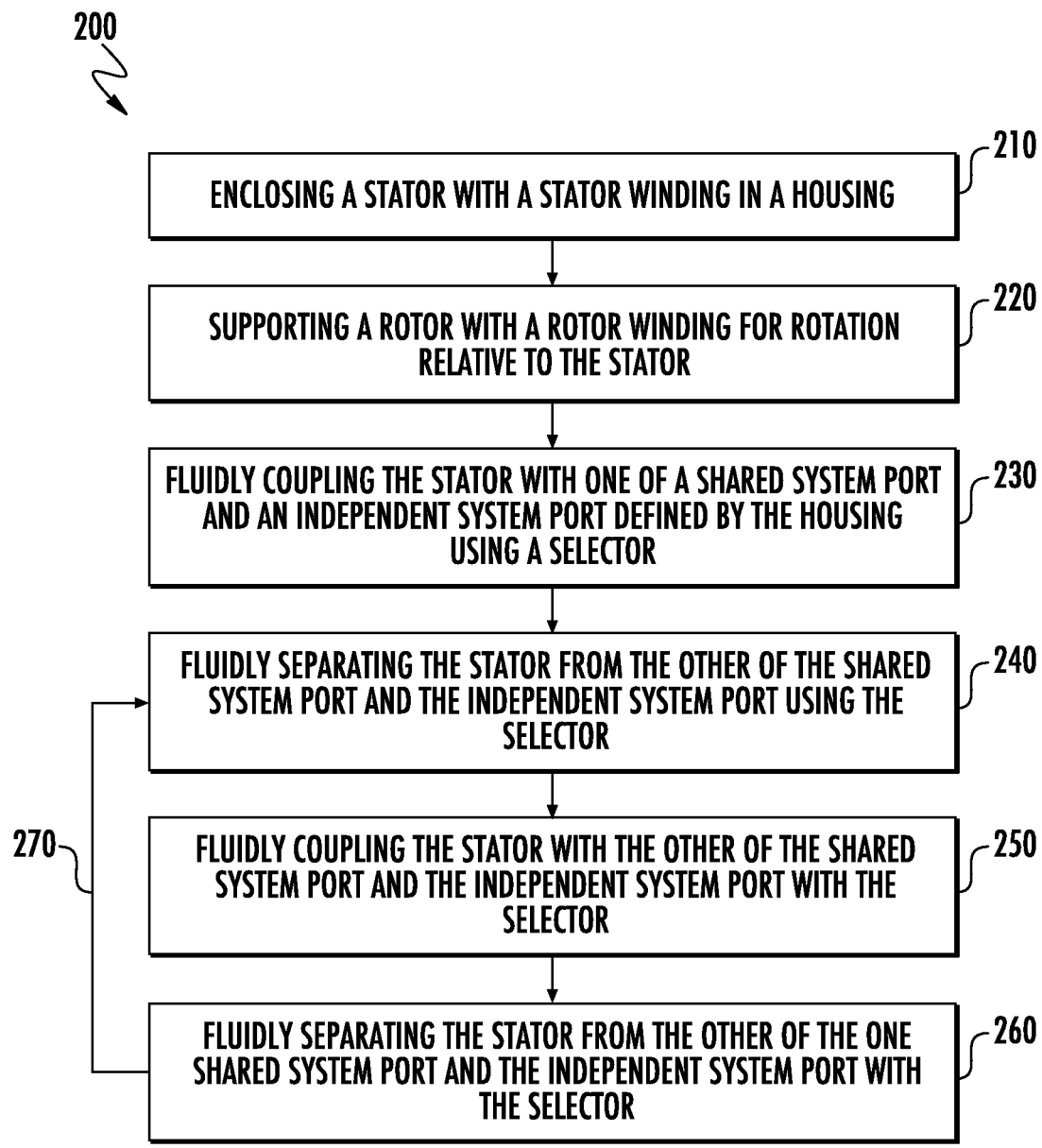
FIG. 8 is a block diagram of a method of making a generator, showing steps of the method according to an embodiment.

Referring now to FIG. 8, a method 200 of making a generator 100 is shown. As shown with box 210, the method 200 includes enclosing a stator with a stator winding within a housing, e.g., the stator 104 (shown in FIG. 2) with the stator winding 148 (shown in FIG. 2) within the housing 102 (shown in FIG. 2). The method also includes supporting a rotor with a rotor winding for rotation relative to the stator, e.g., the rotor 106 (shown in FIG. 2) with the field winding 154 (shown in FIG. 2), as shown with box 220.

The stator is fluidly coupled to one of a shared system port and an independent system port by a selector, as shown with box 230. For example, one or more of the oil-in selector 174 (shown in FIG. 2), the oil-out selector 176 (shown in FIG. 2), and the scavenge selector 178 (shown in FIG. 2) can fluidly couple the stator to an independent system port and fluidly separate the stator from a shared system port. Alternatively, one or more of the oil-in selector 174 (shown in FIG. 2), the oil-out selector 176 (shown in FIG. 2), and the scavenge selector 178 (shown in FIG. 2) can fluidly couple the stator to a shared system port and fluidly separate the stator from an independent system port. It is contemplated that the shared system port include one of the shared system oil-in port 120 (shown in FIG. 2), the shared system oil-out port 122 (shown in FIG. 2), and the shared system scavenge port 124 (shown in FIG. 2). It is also contemplated that the independent system port include one of the independent system oil-in port 130 (shown in FIG. 2) and the independent system oil-out port 132 (shown in FIG. 2). As shown with box 240, the stator is fluidly separated from the other of the shared system port and the independent system port.

As shown with boxes 250 and 260, the connectivity provided by the selector is thereafter reversed. In particular, the stator is fluidly coupled with the other of the shared system port and the independent system port, as shown with box 250, and the stator fluidly separated by the selector from the one of the shared system port and the independent system port, as shown with box 260. As shown with box 270, the connectivity provided by the selector can be changed to configure the generator for operation with a shared oil system or an independent oil system, e.g., the engine oil system 16 (shown in FIG. 1) or the independent oil system 22 (shown in FIG. 1).

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A generator, comprising:
   a stator with a stator winding;
   a rotor with a field winding supported for rotation relative to the stator;
   a housing enclosing the stator and the rotor, the housing having an independent system port connected to a shared system port by a selector; and
   wherein the selector fluidly couples the stator and one of the independent system port and the shared system port, and wherein the selector fluidly separates the stator from the other of the independent system port and the shared system port.

2. The generator as recited in claim 1, wherein the housing has a conduit with defining a flow area arranged within an interior of the housing, wherein the selector spans the flow area of the conduit.

3. The generator as recited in claim 1, wherein the selector comprises a flow passer having a tool engagement feature, wherein the tool engagement feature is located within an interior of the housing.

4. The generator as recited in claim 1, wherein the selector comprises a flow blocker, the flow blocker comprising:
   a first seal member extending about a first end of the selector and compressively fixed between the housing and a first seat of the selector; and
   a second seal member extending about a second end of the selector, the second end longitudinally opposite the first end, the second seal member compressively fixed between the housing and a second seat of the selector.

5. The generator as recited in claim 1, wherein the selector comprises a flow passer with a flow passage extending therethrough, the flow passage of the flow passer fluidly coupling the stator to the one of the independent system port and the shared system port.

6. The generator as recited in claim 1, wherein the selector comprises a flow blocker with a monolithic body, the monolithic body of the flow blocker fluidly separating the stator from the other of the independent system port and the shared system port.

7. The generator as recited in claim 1, wherein the selector comprises a first seat and a second seat, the first seat connecting the independent system port to the stator, the second seat connecting the shared system port to the stator.

8. The generator as recited in claim 7, further comprising:
   a flow blocker fixed within the first seat and fluidly separating the shared system port from the stator; and
   a flow passer fixed within the second seat and fluidly coupling the independent system port to the stator.

9. The generator as recited in claim 7, further comprising:
   a flow passer fixed within the first seat and fluidly coupling the shared system port to the stator; and
   a flow blocker fixed within the second seat and fluidly separating the independent system port from the stator.

10. The generator as recited in claim 7, wherein at least one of the first seat and the second seat extend through a conduit arranged within an interior of the housing.

11. The generator as recited in claim 1, wherein the housing has a drive end and an anti-drive end, wherein the shared system port is arranged on the drive end of the housing, wherein the independent system port is arranged between the drive end and the anti-drive end of the housing or the anti-drive end of the housing.

12. The generator as recited in claim 1, wherein the shared system port is a shared system oil-in port, wherein the independent system port is an independent system oil-in port, and wherein the housing has a shared system oil-out port and an independent system oil-out port connected to the selector.

13. The generator as recited in claim 12, further comprising:
   an inline screen connecting the shared system oil-out port to the selector; and
   a scavenge filter connecting the independent system oil-out port to the selector.

14. The generator as recited in claim 12, further comprising:
   a scavenge pump connecting the independent system oil-out port to the selector; and
   an inline screen connecting the shared system oil-out port to the selector.

15. The generator as recited in claim 1, wherein the shared system port is a shared system scavenge port, wherein the independent system port is an independent system oil-in port, the generator further comprising:
   a scavenge filter bypass conduit connecting the selector to the shared system scavenge port; and
   a check valve connecting the selector to the independent system oil-in port.

16. The generator as recited in claim 1, wherein the selector is an oil-in system selector, the generator further comprising:
   an oil-out selector connected to the oil-in selector by the stator; and
   a scavenge selector connected to the oil-in selector by the rotor.

17. A generator arrangement, comprising:
   a generator as recited in claim 1;
   an independent oil system connected to the independent system port; and
   a plug seated in the shared system port.

18. A generator arrangement, comprising:
   a generator as recited in claim 1;
   an accessory gearbox with an accessory mount supporting the generator, wherein the shared system port is arranged between the generator and the accessory mount; and
   a plug seated in the independent system port.

19. A method of making a generator, comprising:
   at a housing having a shared system port and an independent system port, enclosing a stator with a stator winding in the housing;
   supporting a rotor with a rotor winding for rotation relative to the stator;
   fluidly coupling the stator with one of the shared system port and the independent system port with a selector; and
   fluidly separating the stator from the other of the shared system port and the independent system port with the selector.

20. The method as recited in claim 19, further comprising:
   fluidly coupling the stator with the other of the shared system port and the independent system port with the selector; and
   fluidly separating the stator from the other of the of the shared system port and the independent system port with the selector.

* * * * *